United States Patent
Parthasarathy et al.

(10) Patent No.: US 9,967,242 B2
(45) Date of Patent: May 8, 2018

(54) RICH CONTENT SCANNING FOR NON-SERVICE ACCOUNTS FOR EMAIL DELIVERY

(71) Applicant: MICROSOFT TECHNOLOGY LICENSING, LLC, Redmond, WA (US)

(72) Inventors: Krishna K. Parthasarathy, Redmond, WA (US); Irfan Somani, Redmond, WA (US); Jinghua Chen, Redmond, WA (US); David Duan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 14/526,709

(22) Filed: Oct. 29, 2014

(65) Prior Publication Data

US 2015/0215302 A1   Jul. 30, 2015

Related U.S. Application Data

(60) Provisional application No. 61/933,495, filed on Jan. 30, 2014.

(51) Int. Cl.
*H04L 29/06* (2006.01)
*H04L 12/58* (2006.01)
*G06Q 10/10* (2012.01)

(52) U.S. Cl.
CPC .......... *H04L 63/08* (2013.01); *G06Q 10/107* (2013.01); *H04L 51/04* (2013.01); *H04L 51/12* (2013.01);
(Continued)

(58) Field of Classification Search
CPC .......... H04L 63/08; H04L 51/04; H04L 51/12; H04L 63/145; H04L 63/0227;
(Continued)

(56) References Cited

U.S. PATENT DOCUMENTS

| 6,957,248 B2 * | 10/2005 | Quine ............... G06Q 10/107 709/206 |
| 7,185,360 B1 * | 2/2007 | Anton, Jr. ............. H04L 63/083 370/252 |

(Continued)

FOREIGN PATENT DOCUMENTS

WO   2001037496 A1   5/2001

OTHER PUBLICATIONS

International Search Report and Written Opinion Issued in PCT Application No. PCT/US2015/013208, dated Jul. 3, 2015, 12 pages.
(Continued)

*Primary Examiner* — Shanto M Abedin

(57) ABSTRACT

Various embodiments are generally directed to techniques and apparatuses to facilitate message communication between registered entities of an email system and other non-registered entities. In one embodiment, a transport component executes on a logic circuit to receive a request to perform a function on an encrypted message. Information embedded in the request is identified to determine if the original request was sent by a registered entity. The embedded information is authenticated with information contained in an authentication information store associated with the original request and if the information is authenticated, the requested function is executed. In addition, if the requested function by the non-registered entity is to send an email message, rich scanning is performed on the email message to ensure the safety thereof.

19 Claims, 12 Drawing Sheets

System 100

(52) U.S. Cl.
CPC ........ *H04L 63/0227* (2013.01); *H04L 63/101* (2013.01); *H04L 63/126* (2013.01); *H04L 63/145* (2013.01); *H04L 63/0428* (2013.01)

(58) Field of Classification Search
CPC . H04L 63/126; H04L 63/0428; H04L 63/101; G06Q 10/107
USPC ..... 726/3, 11–15, 22–25; 709/206, 207, 227
See application file for complete search history.

(56) References Cited

U.S. PATENT DOCUMENTS

| | | | | |
|---|---|---|---|---|
| 7,571,220 | B1* | 8/2009 | Ng | H04L 12/585 709/219 |
| 7,853,989 | B2* | 12/2010 | Katsikas | G06Q 10/107 726/3 |
| 8,443,447 | B1* | 5/2013 | Chen | H04L 63/145 713/188 |
| 8,837,739 | B1* | 9/2014 | Sexton | H04L 63/0464 380/278 |
| 2002/0010917 | A1* | 1/2002 | Srikantan | H04L 29/06 725/1 |
| 2004/0111480 | A1* | 6/2004 | Yue | H04L 29/06 709/206 |
| 2004/0181462 | A1* | 9/2004 | Bauer | G06Q 30/0601 705/26.1 |
| 2004/0181581 | A1* | 9/2004 | Kosco | G06Q 10/107 709/206 |
| 2004/0260778 | A1* | 12/2004 | Banister | G06Q 10/107 709/206 |
| 2005/0055404 | A1* | 3/2005 | Kitchen, Jr. | H04L 51/12 709/206 |
| 2005/0257099 | A1* | 11/2005 | Bounkong | G06T 1/005 714/48 |
| 2006/0085505 | A1 | 4/2006 | Gillum et al. | |
| 2006/0253597 | A1* | 11/2006 | Mujica | H04L 51/12 709/229 |
| 2007/0005716 | A1* | 1/2007 | LeVasseur | H04L 51/14 709/206 |
| 2007/0011261 | A1* | 1/2007 | Madams | H04L 12/58 709/207 |
| 2007/0038709 | A1* | 2/2007 | Medvedev | G06Q 10/107 709/206 |
| 2008/0168536 | A1* | 7/2008 | Rueckwald | H04L 12/585 726/4 |
| 2009/0198995 | A1* | 8/2009 | Finlay | H04L 12/58 713/153 |
| 2009/0217027 | A1* | 8/2009 | Ayalon | H04L 9/083 713/150 |
| 2010/0257352 | A1* | 10/2010 | Errico | G06F 21/32 713/151 |
| 2011/0004919 | A1* | 1/2011 | Chawla | H04L 51/12 709/206 |
| 2011/0041158 | A1* | 2/2011 | Ranzini | G06Q 10/107 726/1 |
| 2011/0276638 | A1* | 11/2011 | Errico | G06Q 10/107 709/206 |
| 2013/0325503 | A1* | 12/2013 | Abrahams | G06Q 50/22 705/3 |
| 2015/0072715 | A1* | 3/2015 | Ireland | H04W 4/14 455/466 |

OTHER PUBLICATIONS

"MOVEit Administrator's Guide", Published on: Aug. 21, 2013, Available at: http://docs.ipswitch.com/MOVEit/DMZ8.0/Help/Admin/en/index.htm#25992.htm.
"Public Mail (Visitors can Email Registered Users)", Published on: Jan. 17, 2011, Available at: http://www.joomlapolis.com/cb-solutions/directory/community-building/messaging/public-mail-visitors-can-email-registered-users.
"SMTP Relay Service Setting", Retrieved on: Feb. 26, 2014, Available at: https://support.google.com/a/answer/2956491?hl=en.
"Outbound relay—Google Apps Administrator Help", Retrieved on: Feb. 26, 2014, Available at: https://support.google.com/a/answer/176054?hl=en&ref_topic=2921034.
U.S. Appl. No. 61/934,490, Sharif, et al., "Tenant Based Custom Signature Validation in Multi Tenant Environment", filed Jan. 31, 2014.

* cited by examiner https://<POD number>.outlook.com/Exchangehostedencryption
710
TO: Bob@securedemail.com
FROM: Alice@unsecuredemail.com
SUBJECT: Re: Study Notes
Dear Bob,
Thank you for sending your message with encryption.
Sincerely,
Alice|
 Hosted by Microsoft Exchange Online Encryption
*FIG. 7*

900

```
RECEIVE INSTRUCTIONS FROM CLIENT DEVICE OF NON-
REGISTERED USER TO REPLY, REPLY-ALL OR FORWARD
MESSAGE SENT BY REGISTERED USER
910
           │
           ▼
ADD NON-REGISTERED USER'S EMAIL ADDRESS TO
CC LINE OF MESSAGE
915
           │
           ▼
COMPOSE EMAIL MESSAGE FROM NON-REGISTERED
USER WITH MIME PAYLOAD AT DECRYPTION PORTAL
920
           │
           ▼
ENCRYPT MESSAGE FROM NON-REGISTERED USER USING
ORIGINAL SENDER AUTHENTICATION INFORMATION
925
           │
           ▼
TRANSPORT NON-REGISTERED USER EMAIL MESSAGE TO
RECIPIENT
930
```

*FIG. 9*

RICH CONTENT SCANNING FOR NON-SERVICE ACCOUNTS FOR EMAIL DELIVERY

BACKGROUND

Email systems are configured to send and receive emails on behalf of registered users that pay for such services. Generally, email systems do not allow non-registered users or users that do not pay for such services, to send email messages to other recipients on their behalf. Open relay servers which do not require paid subscriptions allow users to send such emails. However, these open relay servers and associated email systems do not provide rich scanning features such as anti-spam and anti-malware services. In certain circumstances, registered users of an email system may send messages to non-registered users or users of such open relay systems. These messages may require a recipient to reply to the message, for example where the registered user is a company inquiring about business opportunities with potential customers. However, if the recipient is not a registered user of the email system, but rather utilizes an open relay system, a reply or forward of the original email may not have undergone content scanning, filtering or even encryption. This may compromise the security of the original sender's mailbox as well as making the registered user's email account susceptible to malware and spam. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to facilitate communication between registered users of an email system and other non-registered users. More particularly, the present embodiments are directed to techniques to allow messages from non-registered users of an email system to be sent utilizing reply, reply all and forward functions when the original email message was sent by a registered email user. Business to consumer email communication is an example of where messages are sent from a registered user (e.g. business) to a non-registered user (consumer). Previously, if a registered user sent an email to a non-registered user of an email system, a response to the message by the non-registered user would have been rejected since email systems typically don't allow anonymous or non-registered users to send mail since they are not paying for the email service. Open relay mail servers typically provide such functionality, but these open relays blindly send email messages without performing rich scanning on the message such as anti-spam, or anti malware processing as well as filtering and encryption.

In order to process a message received from an unregistered user of an email system, information associated with the original sender or registered user is embedded in the email message. If the non-registered user replies to and/or forwards the email from the original sender, the current system scans the reply or forwarded email message and determines if the original sender is a registered user of the email system by, for example, email address verification. If the original sender is a registered user, the email system provides rich scanning of the message and sends the email from the non-registered user thereby ensuring that the reply or forwarded message is safe. If the original sender is not a registered user, the email system denies the request to send the email message on behalf of the non-registered user. In this manner, an email system may be configured to provide rich scanning, filtering and encryption of messages from non-registered users if the original message was sent by a registered user. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates the user experience when replying to an encrypted message.

FIG. 9 illustrates an embodiment of a logic flow for the system of FIG. 1.

DETAILED DESCRIPTION

Figure 1:
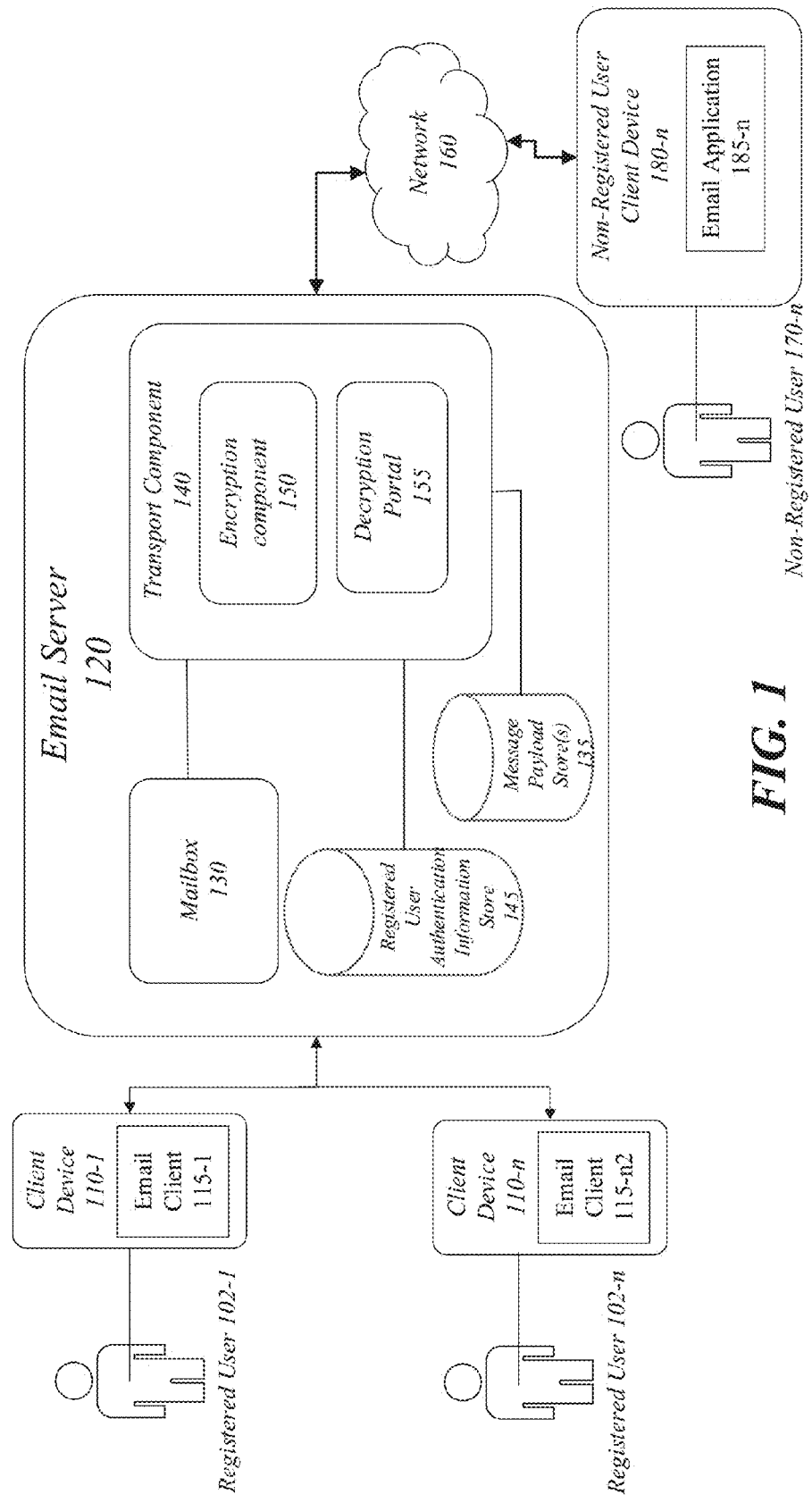
FIG. 1 illustrates an embodiment of a rich scanning system.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for a specific purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

The following description applies to one example implementation in which an email system is configured to send and receive emails on behalf of registered users that pay for such services. Generally, email systems do not allow non-registered users or users that do not pay for such services, to send email messages to other recipients on their behalf. Open relay servers which do not require paid subscriptions allow users to send such emails. However, these open relay servers and associated email systems do not provide rich scanning features such as anti-spam and anti-malware services. In certain circumstances, registered users of an email system may send messages to non-registered users or users of such open relay systems such as, for example in the case of messages being sent by businesses to potential consumers. These messages may require the recipient to reply to the message. However, if the recipient is not a registered user of the email system, but rather utilizes an open relay system, a reply or forward of the original email may not have undergone content scanning, filtering or even encryption. This may compromise the security of the original sender's mailbox as well as making the registered user's email account susceptible to malware and spam.

In order to process a message received from the unregistered user of an email system, information associated with the original sender or registered user is embedded in the email message. If the non-registered user replies to and/or forwards the email from the original sender, the current system scans the reply or forwarded email message and determines if the original sender is a registered user of the email system by, for example, email address verification. If the original sender is a registered user, the email system provides rich scanning of the message and sends the email from the non-registered user thereby ensuring that the reply or forwarded message is safe. If the original sender is not a registered user, the email system denies the request to send the email message on behalf of the non-registered user. Other embodiments are described and claimed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may include an email server 120 and one or more client devices, such as client devices 110-1 . . . 110-n associated with registered users or entities 102-1 . . . 102-n. Although the system 100 shown in FIG. 1 has a limited number of elements in a certain topology, it may be appreciated that the system 100 may include more or less elements in alternate topologies as desired for a given implementation. In addition, the use of the term "tenant" herein is intended to indicate that a user 102-1 . . . 102-n is a registered user and has paid for or been authorized to use the system 100.

System 100 may include a plurality of client devices 110-1 . . . 110-n each having a corresponding email client 115-1 . . . 115-n. Each of the email clients 115-1 . . . 115-n communicate with email server 120 to send, receive and manage email messages in an email account associated with a respective client device 110-1 . . . 110-n. A client device, such as client device 110-1, may respond to user directives received through various input devices, e.g. a keyboard, touch screen, a mouse, a stylus, a voice response system, and so forth. User directives may cause client device 110-1 to, for example, launch email client 115-1, select an email, delete an email, generate a new email message and add text to the email message, and so forth.

Each of the email clients 115-1 . . . 115-n may be a software application comprising instructions that, when executed by a corresponding client device 110-1 . . . 110-n, provide an interface for viewing, composing, and managing email messages. By way of example, email client 115-1 may connect to email server 120 to download new messages and to send messages composed on client device 110-1. Email clients 115-1 . . . 115-n may be a stand-alone application, such as, e.g. MICROSOFT OUTLOOK® from MICROSOFT CORPORATION®. Email clients 115-1 . . . 115-n may be a web client that accesses email server 1120 through a web browser application such as EXPLORER® from MICROSOFT CORPORATION®.

Email server 120 may represent one or more electronic devices that provide and host email services for multiple clients. Email server 120 may be implemented as one or more on-premises electronic devices, for example, for a business location. Email server 120 may also be implemented as a remote or "cloud" deployment accessible over a network, such as the Internet. Email server 120 may be arranged to provide email services such as, but not limited to, receiving email messages for an email account, sending email messages from an email account, storing email messages, and providing filtering services, such as spam filtering.

In an embodiment, email server 120 may include various functional components, such as a mailbox 130, transport component 140, and decryption portal 155. Email server 120 may include alternate, fewer or additional components to provide the functionality described herein. In various embodiments, some components may be combined into one component. The embodiments are not limited to these examples.

Email server 120 may store email messages in mailbox 130. Each email account may have its own logical mailbox 130. In other words, mailbox 130 may represent the logical storage for all email messages of an account associated with a tenant of the system 100 or registered user 102-1 ... 102-n. Email server 120 may include a memory device which stores email message data from registered users. A mailbox 130 may have sub-mailboxes, such as an inbox, a sent mail box, a deleted items box, a junk mail box, and user-defined mailboxes, etc. A mailbox 130 may store all messages for an email account until a user chooses to delete the messages from email server 120.

Email server 120 may include transport component 140 used to send emails from/to a registered user 102-1 ... 102-n via network 160. Transport component 140 may be configured to process email messages sent or received from an email client 115-1 ... 115-n for sending over various networks including, for example, packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). Transport component 140 may also send an email from non-registered users stored in a memory store 135 as explained in more detail below. Transport component 140 may also operate to provide email management services on behalf of email server 120. Such functional components may, for example, identify an intended recipient, process and apply mail rules created by a recipient, synchronize with mobile or remote clients, and so forth.

Transport component 140 may include encryption component 150 used to provide various safeguards to protect the security of the email message sent by a registered user 102-1 ... 102-n and decryption portal 155 used to verify a message from a non-registered user in response to a message from a registered user. When an email message is received by transport component 140, encryption logic is triggered to encrypt the message payload using encryption component 150. The email message payload may be an HTML attachment which has the encrypted message. For example, the email message payload to be transported via transport component 140 may be encrypted at the meta-data level to include information associated with the email sender (for example, registered user authentication information, identification information of the organization for which the registered user is associated, etc.). The email message payload may be encrypted using the registered user's rights management services (RMS) keys which works with internet browsers to safeguard the contents of the message. Registered user authentication information store 145 may be used to store information for each of the tenants or registered users 102-1 ... 102-n associated with system 100. Typically, this user authentication information may be represented by the email address of a registered user 102-1 ... 102-n, but other authentication methods may also be used.

When a registered user 102-1 ... 102-n sends an email message, the email client 115-1 of an associated client device 110-1 accesses email server 120. This may be done via standard SMTP (Simple Mail Transfer Protocol) communication. The email message may be from an individual user or may be from a business sending product/service information to the email addresses of existing and/or potential customers. The message may also include attachment(s) or links to particular web pages. The message is authenticated by email server 120 to ensure that it's associated with a registered user 102-1 ... 102-n or tenant of system 100. The message is written into mailbox 130 which stores it in memory. The message is encrypted utilizing encryption component 150 for sending to one or more recipients utilizing transport component 140 via network 160. The encrypted message payload includes the identification of the registered user 102-1 ... 102-n sending the email message.

If the recipient of the email message from the registered user 102-1 ... 102-n is a non-registered user or entity 170-n and the non-registered entity replies to or forwards the email message sent from email server 120, the non-registered user 170-n is considered a "non-tenant" since the non-registered user 170-n has not paid for the service provided by email system 100. In other words, the original recipient of the email message from a registered user 102-n, for example, may be a non-registered user 170-n that is utilizing a different email system than system 100. For example, non-registered user 170-n may be utilizing a non-registered user client device 180-n and associated email application 185-n (e.g. open relay server). To verify whether or not the recipient is a non-registered user 170-n of email system 100, identification information of the non-registered user 170-n is compared with information contained in the registered user authentication information store 145. The non-registered user may be requested to sign in using particular identification information. However, when a request to send a message is received by email server 120 from a sender that is either replying to or forwarding an original message sent by a registered user 102-1 ... 102-n, decryption portal 155 verifies that the registered user's authentication information is embedded in the request to reply to or forward the message. The identification information associated with registered user 102-1 ... 102-n embedded in the reply or forward email from the non-registered user 170-n is authenticated by decryption portal 155 by comparing the embedded registered user 102-1 ... 102-n information with that contained in the registered user authentication information store 145. The non-registered user 170-n that is replying to or forwarding the email message received from a registered user 102-1 ... 102-n is identified as a "safe tenant". Each reply and/or forward request from the safe tenant is received by the email server 120 and the message is composed with MIME payload utilizing an API (Application Programming Interface) via decryption portal 155. Decryption portal 155 may also have a pre-defined standard message configuration for reply to and forwarded messages from non-registered users where the original sender is a registered user of system 100. Since the non-registered user or safe tenant does not have a mailbox (e.g. 130) on email server 120, memory store 135 is used to cache the encrypted payload that is posted back to the decryption portal 155.

The message from the non-registered user 170-n composed by decryption portal 155 is then received by and the transport component 140 which performs rich scanning of the message and sends the message on behalf of the non-registered user 170-n via network 160. In other words, the system 100 allows a non-registered user 170-n to reply or forward an email message that originated with a registered user 102-1 ... 102-n by verifying embedded identification information associated with the registered user 102-1 ... 102-n in the reply or forward email from the non-registered user 170-n. Previously, this reply or forwarded message from the non-registered user 170-n would have been rejected. In this manner, a non-registered user 170-n may become a "safe tenant" associated with system 100 which allows the non-registered user 170-n to reply to and/or forward an email message received from a registered user 102-n by having the email server 120 authenticate that the original message that the non-registered user is replying to or forwarding was sent by a registered user 102-*n* and that the message has undergone rich scanning and/or encryption and the message is safe to proceed to transport component 140 where it is sent via network 160.

Figure 2:
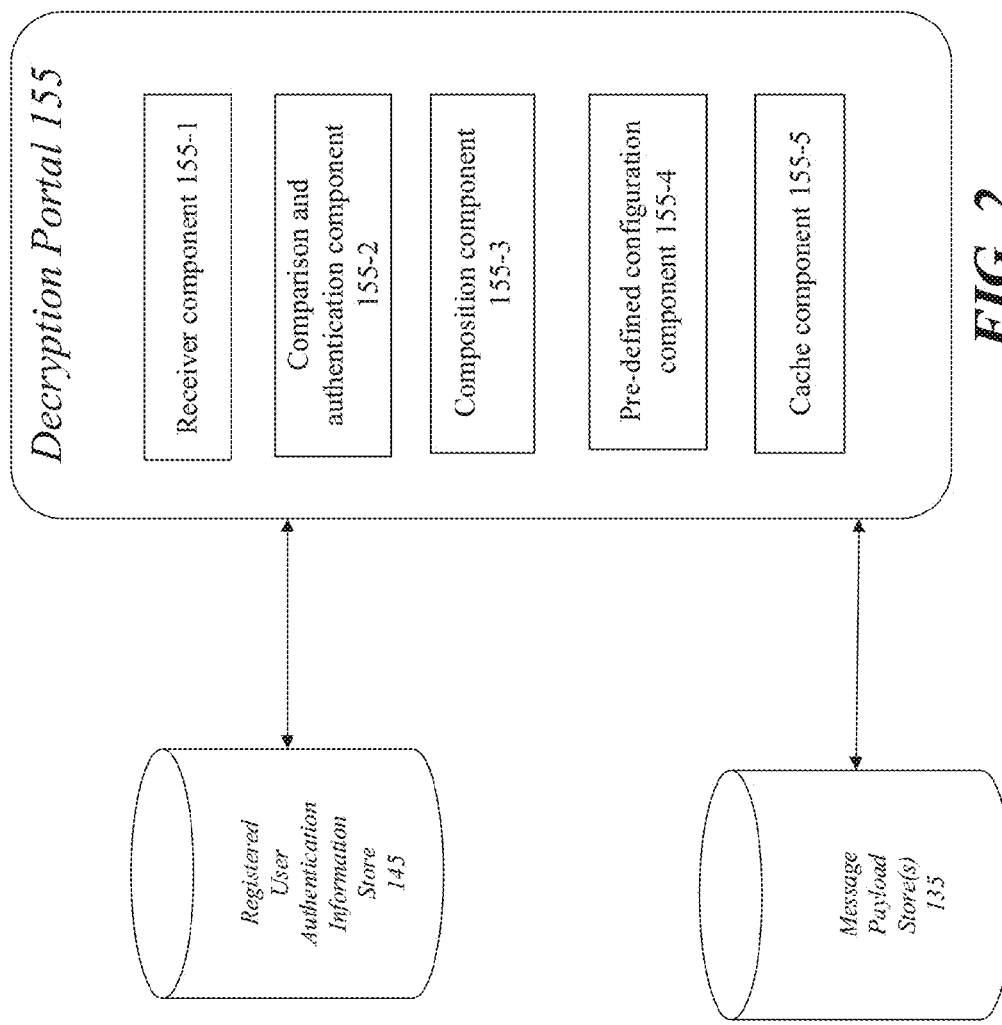
FIG. 2 illustrates an embodiment of a decryption portal.

FIG. 2 illustrates one embodiment of decryption portal 155. Receiver component 155-1 may be operative to receive requests to reply or forward emails. Those requests may arrive via network 160 after having been authored by non-registered user 170-*n* using email application 185-*n* on non-registered user client device 180-*n*. Comparison and authentication component 155-2 may then determine that the request originated from a non-registered user by accessing registered user authentication information store 145. Comparison and authentication component 155-2 may further determine that the sender is either replying to or forwarding an original message from a registered user. Comparison and authentication component 155-2 may verify the registered user's identity by comparing information embedded in the request with information stored in registered user authentication information store 145. If the sender is a non-registered user replying to or forwarding an email message from a registered user, then the sender may not have a mailbox available, so information associated with the sender may be stored in the cache component 155-5, which may further store the information in message payload store 135. In one embodiment, comparison and authentication component 155-2 operates simultaneously with receiver component 155-1, and if comparison and authentication component 155-2 detects that the request has an invalid signature, then it will immediately halt the receipt, and issue an error message. Composition component 155-3 may compose an email based on the request, and this may include, for example, composing the email with a MIME payload. Pre-defined configuration component 155-4 may configure the message based on a pre-defined configuration for messages from non-registered users. Examples of pre-defined formatting rules may include modifying the message or subject line to indicate that there is encryption present, adding an image (for example, the logo of the organization), or appending a textual disclaimer to the end of a message. Other pre-defined rules may be set depending on the policies of the organization. The email may be stored in cache component 155-5, accessing message payload store 135. The email may be transmitted to the transport component 140 for scanning and delivery.

Figure 3A:
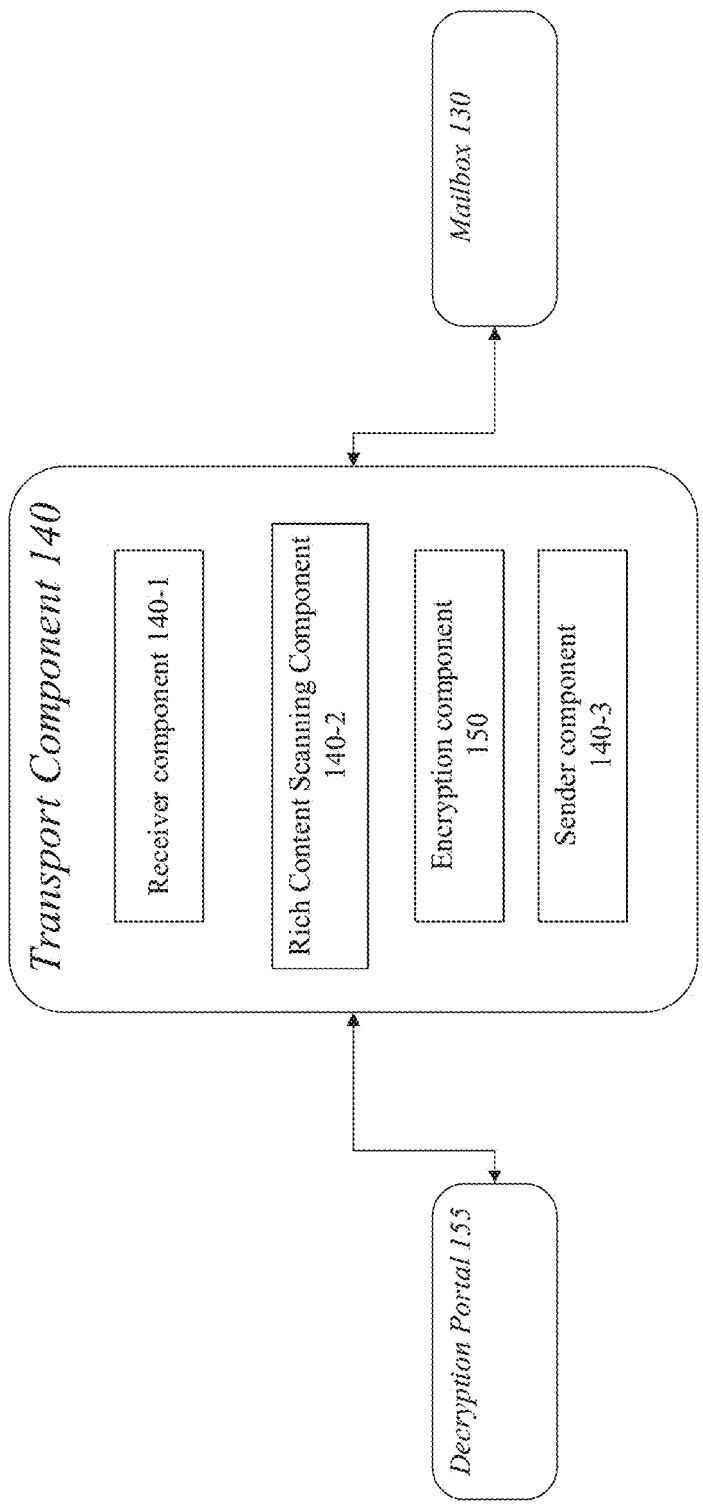
FIG. 3A illustrates an embodiment of transport component.

FIG. 3A illustrates one embodiment of transport component 140. Transport component 140 may include receiver component 140-1 which receives emails, including those from decryption portal 155. Transport component 140 may include rich content scanning component 140-2, which performs rich content scanning of emails. Encryption component 150 may encrypt the email. Encryption may be done at the meta-data level to include information associated with the email sender (for example, registered user authentication information, identification information of the organization for which the registered user is associated, etc.). Encryption may be done by public-key encryption, whereby encryption component 150 only needs the recipient's public key in order to encrypt the message, or may be done by private-key encryption whereby encryption component 150 and the recipient both use the same private key. Sender component 140-3 may transmit the email, for example by sending it to mailbox 130 stored on email server 120. Transport component 140 may process emails in the order they are received, or may sort them by priority, or may use alternative sorting mechanisms based on organizational policies. Sender component 140-3 may throttle email delivery if it detects that, for example, too many emails are being sent by the same sender or to the same recipient. Sender component 140-3 may also localize the emails based on, for example, the location of the sender, the location of the registered user, or based on an organizational policy.

Figure 3B:
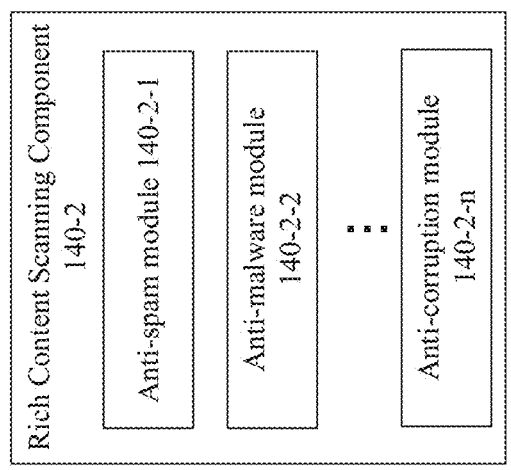
FIG. 3B illustrates one embodiment of rich content scanning component.

FIG. 3B illustrates one embodiment of rich content scanning component 140-2. Rich content scanning component 140-2 may contain several modules for various scanning purposes. By way of example, rich content scanning component 140-2 may include an anti-spam module 140-2-1 that may scan the email to determine if it is spam. Spam generally refers to unsolicited and unwanted email messages sent in bulk. Spam may contain links which direct the recipient to harmful websites or attempt to improperly solicit a user's private information. Anti-malware module 140-2-2 may scan the email and any attachments to determine if they contain malware. Malware, also known as malicious software, is typically designed to disrupt computer operation. Malware includes, for example, computer viruses, Trojan horses, worms, spyware, ransomware, adware, scareware, etc. Anti-corruption module 140-2-*n* may check the email for any form of corruption. Corruption typically refers to unintended changes made to data during storage, transmission, reading, writing, or processing. Rich content scanning component 140-2 may include other modules depending on the type of rich content scanning desired by the organization.

Figure 4:
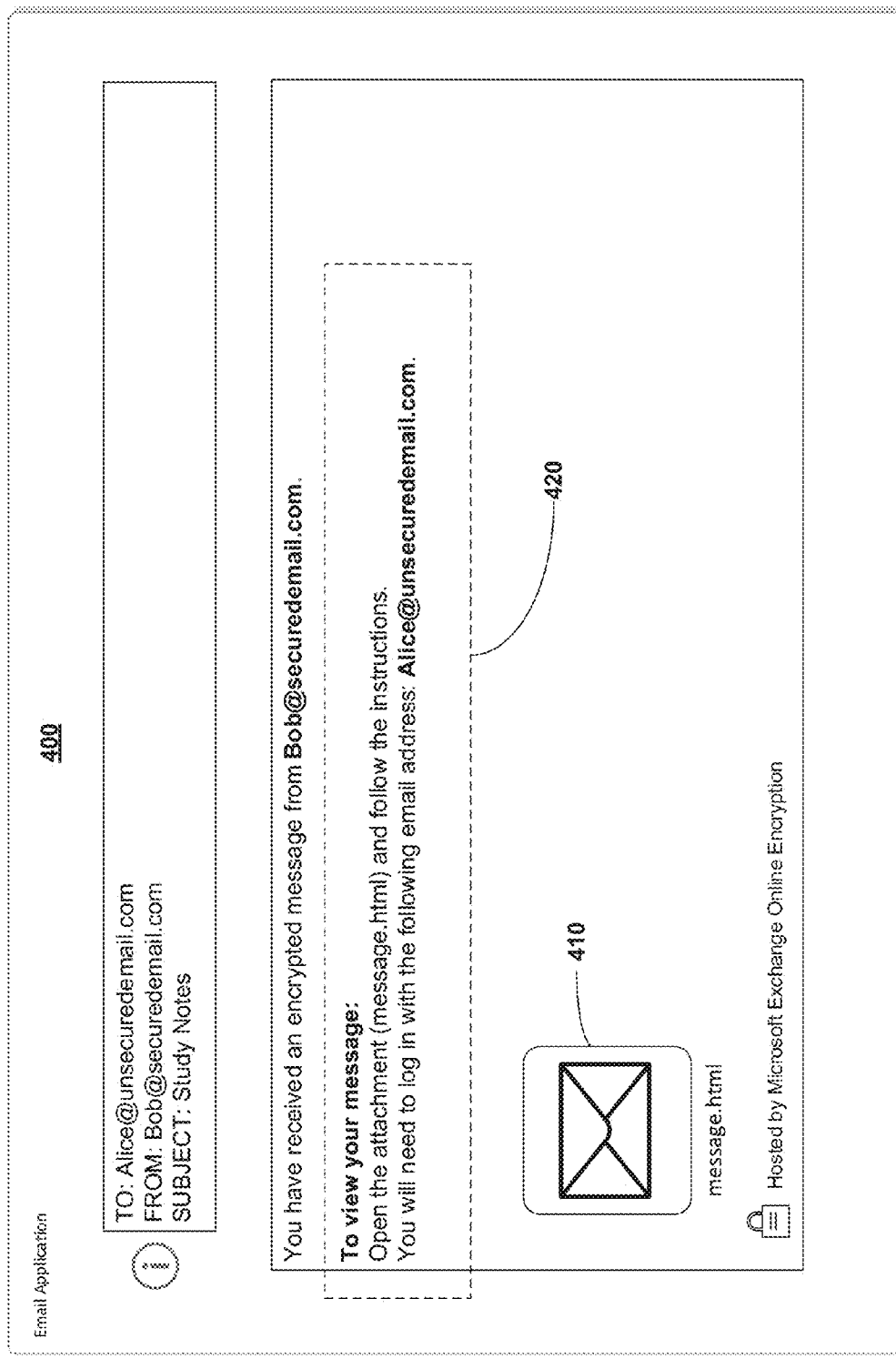
FIG. 4 illustrates an exemplary email that a non-registered user may receive from a registered user.

FIG. 4 illustrates an exemplary email 400 that a non-registered user may receive from a registered user. The email includes the encrypted message 410 as an attachment, and provides instructions 420 as to how to open the attachment and decrypt it for viewing. The non-registered user may view this email using email application 185-*n* on non-registered user client device 180-*n*. In this example, Bob@securedemail.com is a registered user of the email system and has sent the exemplary email message 400 to Alice@unsecuredemail.com who is not a registered user of the email system. The subject of the exemplary email message is "study notes."

Figure 5:
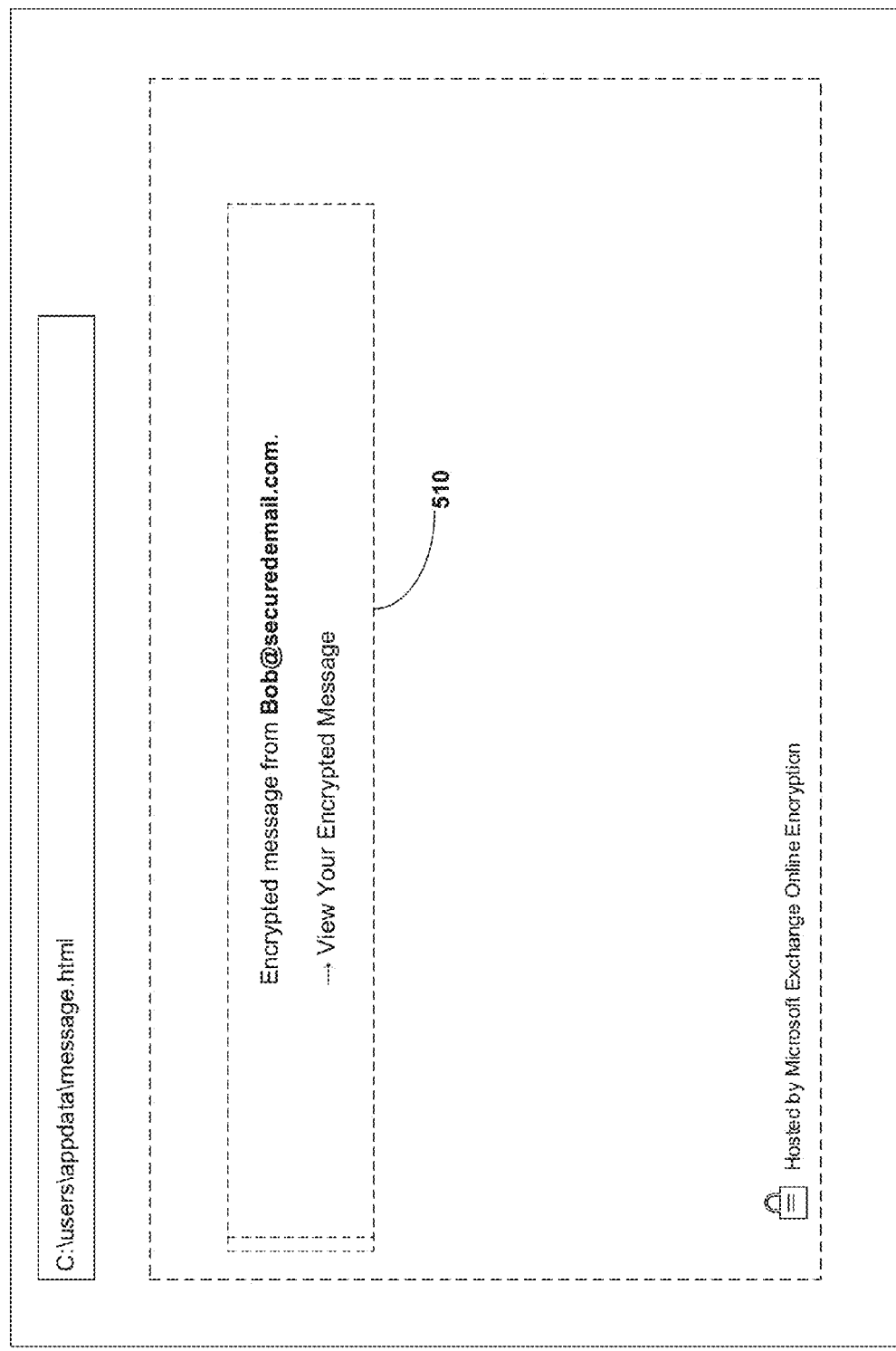
FIG. 5 illustrates an encrypted attachment that a non-registered user may view locally on a client device.

FIG. 5 illustrates the exemplary email message 500 as seen by the unregistered user with the encrypted attachment locally on non-registered user client device 180-*n*. The message 510 may include a link directing the user to view the decrypted message. In this example, the message is from the registered user, Bob@securedemail.com and may indicate where the message may be located on the client device of the non-registered user (e.g. C:\users\appdata\message.html).

Figure 6:
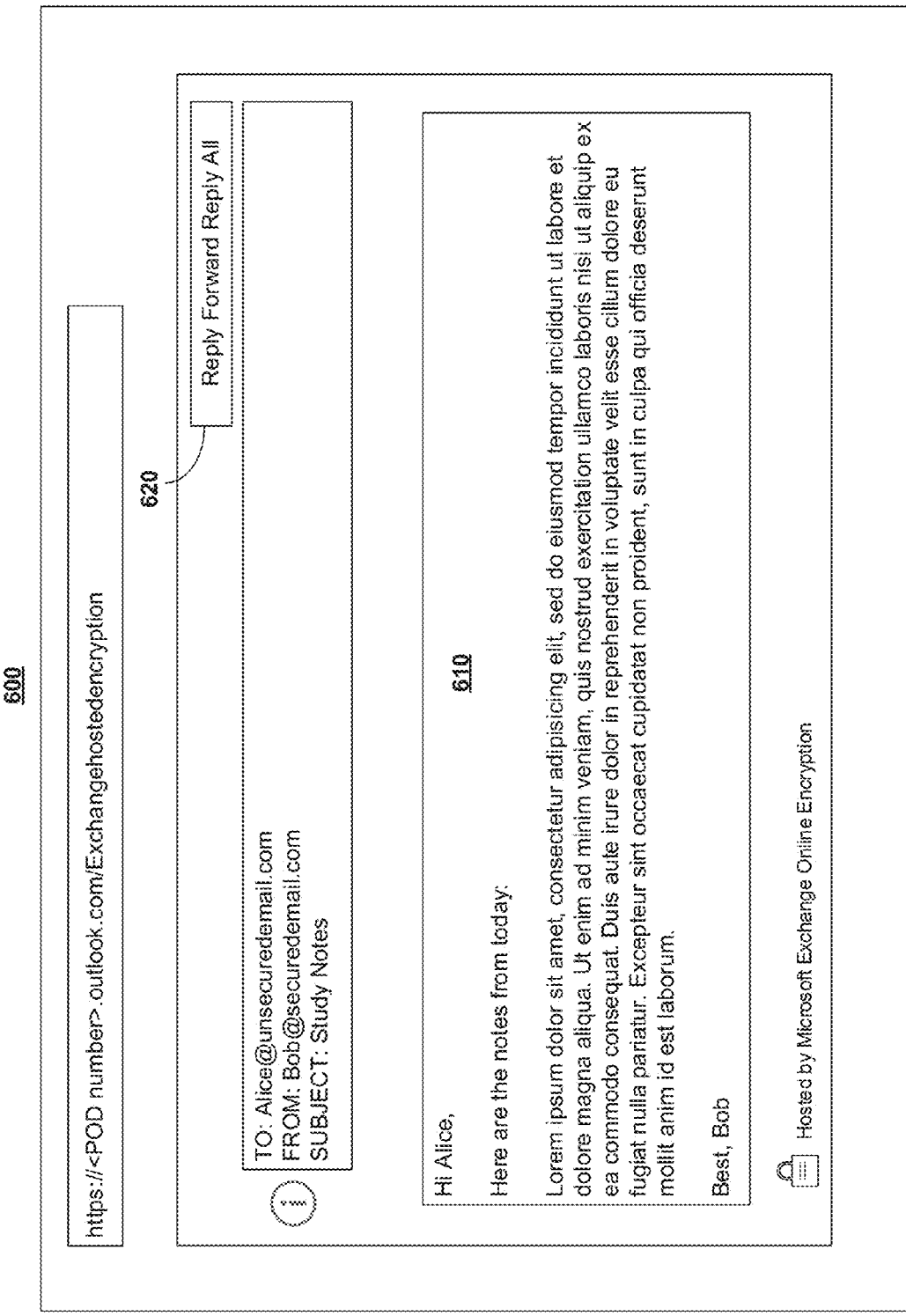
FIG. 6 illustrates a decrypted message that a non-registered user may access via a network.

FIG. 6 illustrates the exemplary email 600 with the decrypted message 610, which the non-registered user may access via network 160. The decrypted message 610 includes options 620 which allow the user to "Reply," "Forward," or "Reply All." Previously, if the registered user Bob@securedemail.com in this example sent such an email to the non-registered user Alice@unsecuredemail.com, a response to the message by Alice@unsecuredemail.com would have been sent by an open relay mail server which would not perform rich scanning on the message such as anti-spam, or anti malware processing as well as filtering and encryption.

FIG. 7 illustrates the user experience after clicking "Reply." For example, the user may create a request 700 to send a reply email 710 and after clicking the "Send" option, the request may be sent to decryption portal 155 from the non-registered user. In this manner, a non-registered user of an email system may Reply," "Forward," or "Reply All" to an email received from a registered user and rich scanning is performed on the message from the unregistered user via decryption portal 155 as explained in more detail below.

Figure 8:
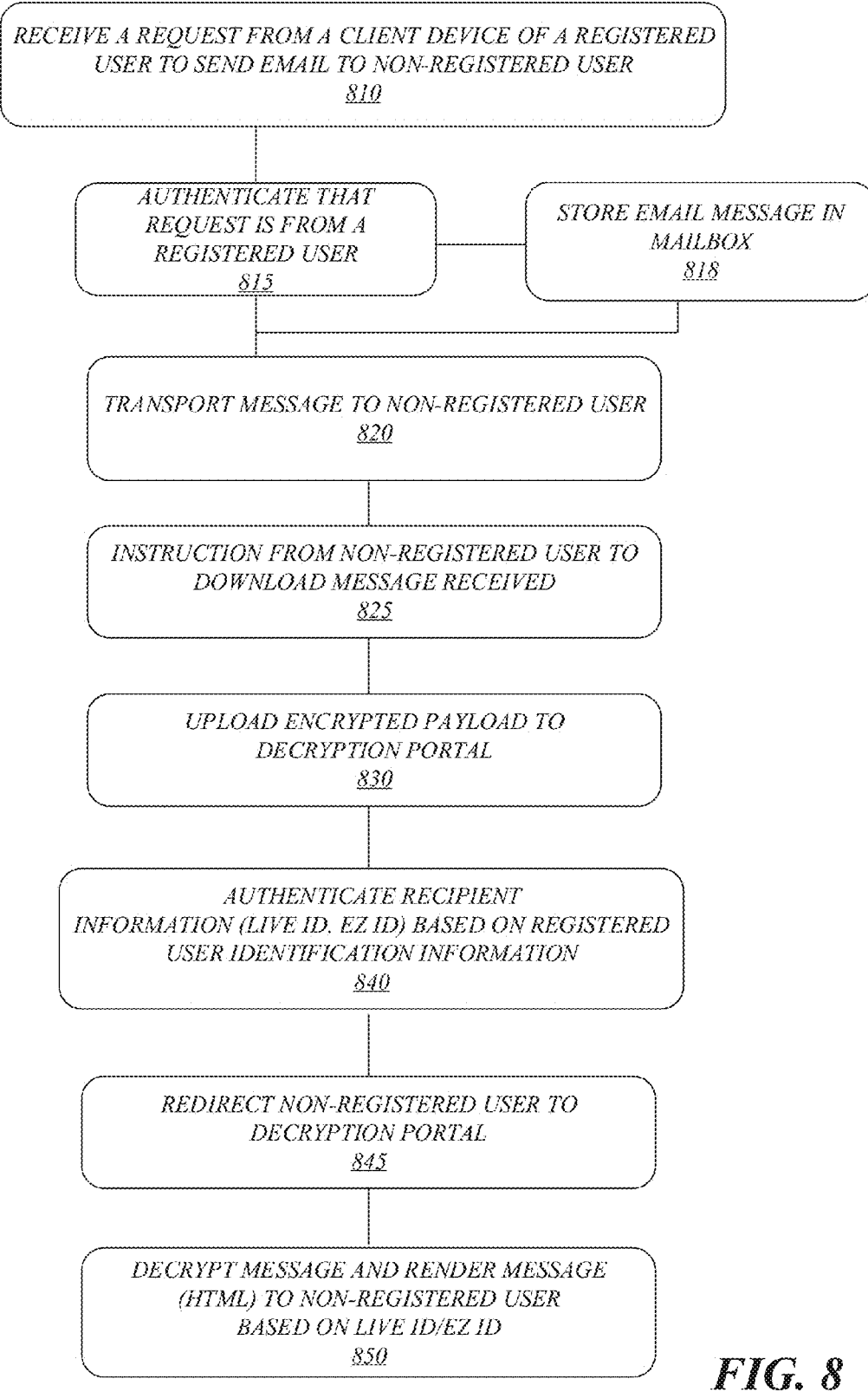
FIG. 8 illustrates an embodiment of a logic flow for the system of FIG. 1.

FIG. 8 illustrates one embodiment of a logic flow 800. Logic flow 800 may be representative of some or all of the operations executed by one or more embodiments described herein. The operations of logic flow 800 may be executed, for example, by email server 120.

In the illustrated embodiment shown in FIG. 8, logic flow 800 may receive a request from a client device of a registered user to send an email to a non-registered user at block 810. For example, a registered user 102-1 . . . 102-n may send a request, via email client 115-1 . . . 115-n of client device 110-1 . . . 110-n to send an email to a non-registered user 170-n. Logic flow 800 authenticates that the request is from a registered user at block 815. For example, email server 120 authenticates that the message to be sent is from a registered user 102-1 . . . 102-n or tenant of system 100.

Logic flow 800 may store the email message from a registered user in a mailbox at block 818. For example, email server 120 may store email messages in mailbox 130. Logic flow 800 transports the message from the registered user to the non-registered user at block 820. For example, the message from the registered user 102-1 . . . 102-n is encrypted utilizing encryption component 150 of email server 120 for sending to one or more recipients utilizing transport component 140. The encrypted message payload includes the identification of the registered user 102-1 . . . 102-n sending the email message. Email server 120 utilizes the transport component 140 to send emails from the registered user 102-1 . . . 102-n via network 160.

Logic flow 800 may receive an instruction from the non-registered user who is the recipient of the email message from the registered user to download the message at block 225. For example, if the recipient of the email message from the registered user 102-1 . . . 102-n is a non-registered user 170-n, the non-registered user 170-n is considered a "non-tenant" since the non-registered user 170-n has not paid for the service provided by email system 100.

Logic flow 800 may upload the encrypted payload to the decryption portal at block 830. For example, the encrypted payload message may be uploaded from the encryption component 150 to the decryption portal 155. Logic flow 200 may authenticate recipient information (e.g. LIVE ID, EZ ID) based on registered user identification information at block 240.

The logic flow may redirect the non-registered user's request view the email message to the decryption portal at block 845. For example, the non-registered user 170-n may be redirected to the decryption portal 155. The logic flow decrypts the message from the registered user and renders it to the non-registered user at block 850. For example, the message from a registered user or tenant 102-1 . . . 102-n is rendered (e.g. HTML) to non-registered user 170-n.

FIG. 9 illustrates one embodiment of a logic flow 900 which may represent some or all of the operations executed by one or more embodiments described herein. The operations of logic flow 900 may be executed, for example, by email server 120.

Logic flow 900 may receive instructions from a client device of a non-registered user to reply, reply-all or forward a message sent by a registered user at block 910. For example, when a request to send a message is received by email server 120 from a sender that is either replying to or forwarding an original message sent by a registered user 102-1 . . . 102-n, decryption portal 155 verifies that the registered user's authentication information is embedded in the request to reply to or forward the message. Logic flow 900 may add the non-registered user's email address to the cc line of the reply, reply-all or forwarded message at block 915.

Logic flow 900 composes the reply, reply-all or forwarded message from the non-registered user with MIME payload at block 920. For example, the reply and/or forward request from the safe tenant is received by the email server 120 and the message is composed with MIME payload by decryption portal 155. Decryption portal 155 may also have a predefined standard message configuration for reply to and forwarded messages from non-registered users. In addition, since the non-registered user does not have a mailbox (e.g. 130) on email server 120, memory store 135 is used to store the encrypted payload associated with reply or forward message. Logic flow 900 may encrypt the reply, reply-all or forward message from the non-registered user using the original sender authentication information at block 925.

Logic flow 900 may transport the non-registered user email message that has been authenticated with the original sender information at block 930. For example, system 100 may treat non-registered user 170-n as a safe tenant associated with system 100, which allows system 100 to send reply messages and/or forward emails on behalf of the non-registered user 170-n by having the email server 120 authenticate that the original message that the non-registered user is replying to or forwarding an email which was sent by a registered user 102-n and that the message has undergone rich scanning and/or encryption and the message is safe to proceed to transport component 140 where it is sent via network 160.

Figure 10:
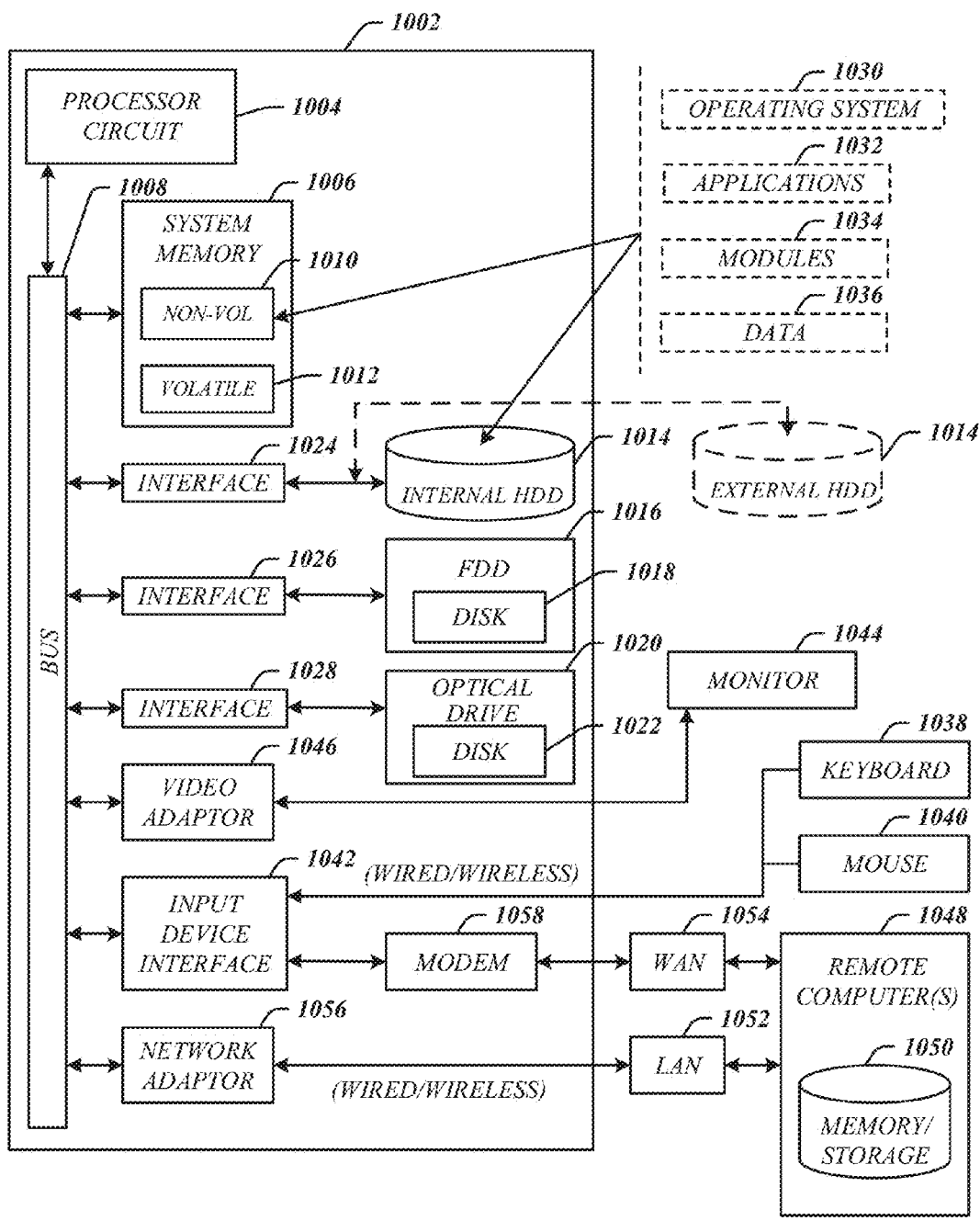
FIG. 10 illustrates an embodiment of an exemplary computing architecture suitable for implementing the system of FIG. 1.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 1, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 404.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 4, the system memory 1006 can include non-volatile memory 410 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
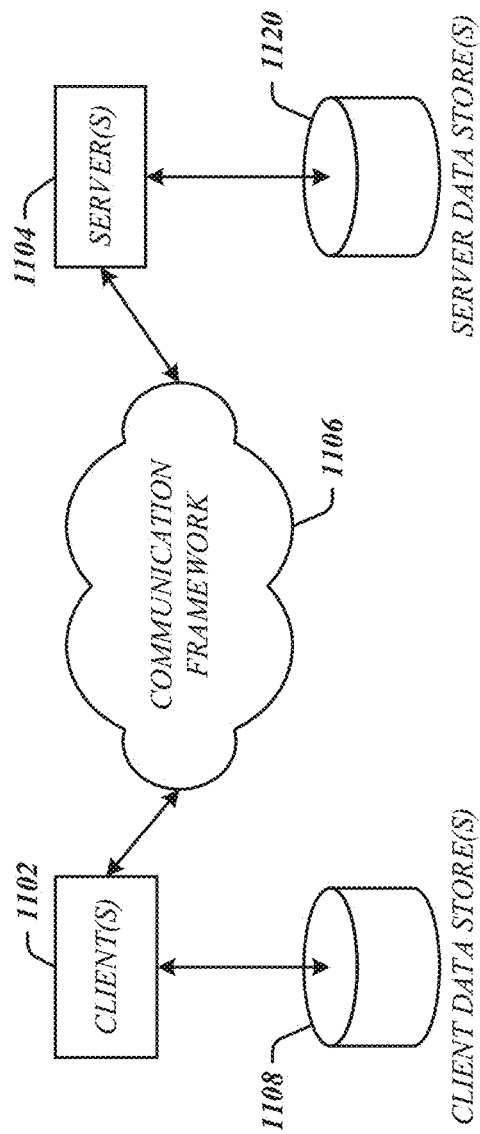
FIG. 11 illustrates a block diagram of an exemplary communications architecture suitable for implementing the system of FIG. 1.

FIG. 11 illustrates a block diagram of an exemplary communications architecture 500 suitable for implementing various embodiments as previously described. The communications architecture 500 includes various common communications elements, such as a transmitter, receiver, transceiver, radio, network interface, baseband processor, antenna, amplifiers, filters, power supplies, and so forth. The embodiments, however, are not limited to implementation by the communications architecture 500.

As shown in FIG. 11, the communications architecture 1100 comprises includes one or more clients 1102 and servers 1104. The clients 1102 may implement the client device 110-1 . . . 110-n. The servers 1104 may implement the server device 120. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth needed by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a logic circuit; and
a transport component executing on the logic circuit to:
receive, from a non-registered entity of an email processing system, a request to perform a function on an encrypted message that corresponds to an original message from a registered entity of the email processing system, wherein the function is to forward or reply to the encrypted message;
identify information associated with the registered entity embedded in the request;

authenticate that the embedded information of the registered entity embedded in the request is contained in an authentication information store;

performing a scanning procedure on the encrypted message; and execute the function based on the request if the embedded information is authenticated by sending an email comprising a payload to include the encrypted message and an identification of the registered entity.

2. The apparatus of claim 1, wherein the transport component is configured to determine whether the entity is a safe tenant.

3. The apparatus of claim 2, wherein the transport component is configured to:

authenticate information associated with registered entity embedded in the request; and process a message from the non-registered entity based on the request.

4. The apparatus of claim 1, wherein the transport component is configured to compose a message based on a pre-defined configuration for replying to or forwarding the message from the registered entity to a non-registered entity.

5. The apparatus of claim 1, wherein the transport component is configured to perform a scanning procedure on a message from the non-registered entity.

6. The apparatus of claim 5 wherein the scanning procedure includes at least one of scanning the message for spam or scanning an email processing system for malware.

7. The apparatus of claim 5 wherein the transport component is further operative to encrypt the message at a metadata level to include information associated with the registered entity.

8. A computer implemented method for execution on a client device of an email processing system, comprising:

receiving, at the client device, a request to use an email function on an encrypted email message;

determining, via a processing circuit in the client device, that the request originated from a safe tenant of the email processing system based upon a comparison between information in the request and information in an authentication information store, wherein the safe tenant is not registered with the email processing system;

determining by email address verification that an original sender of the encrypted email message is registered with the email processing system based on the information in the request; and executing the email function on the processing circuit by forwarding or replying to the encrypted email message.

9. The computer-implemented method of claim 8 wherein the request is from a non-registered entity to forward or reply to the encrypted email message.

10. The computer-implemented method of claim 9 further comprising encrypting an email message from the non-registered entity.

11. The computer-implemented method of claim 10 wherein the email message is encrypted at the meta-data level to include information associated with the registered entity.

12. The computer-implemented method of claim 8, further comprising:

identifying information associated with a registered entity embedded in the request from the non-registered entity; and authenticating the request based on the embedded information.

13. The computer-implemented method of claim 12 wherein the request is to generate an email message from the non-registered entity, the method further comprising performing a rich scanning procedure on the email message from the non-registered entity.

14. The computer-implemented method of claim 13 wherein the rich content scanning procedure includes scanning the email message for spam and scanning the email message for malware.

15. An article of manufacture comprising computer-readable storage hardware containing instructions that, when executed by a processing circuit, cause the computer to:

receive a request from an application on a client device;

determine if the request originates from a safe tenant or if the request is in response to an action taken by a safe tenant, wherein the safe tenant is a non-registered user of an email processing system; and execute the request if it originated from a safe tenant or if the request was in response to an action taken by a safe tenant by authenticating a registered user of the email processing system based on embedded information in the request and sending a message comprising a pre-defined standard message configuration for reply to and forwarded messages where an original sender is the registered user of the email processing system, the message further comprising an encrypted payload to include an original message and an identification of the registered user.

16. The article of manufacture of claim 15 containing instructions further operative to cause the computer to operate an email server, wherein the safe tenant does not have a mailbox at an email processing system.

17. The article of manufacture of claim 16 containing instructions further operative to cause the computer to:

identify information associated with the registered entity embedded in the request from the non-registered entity;

authenticate the registered entity based on the embedded information in the request using a user authentication information store; and compose an email based on the request.

18. The article of manufacture of claim 17 containing instructions further operative to cause the computer to encrypt the email at the meta-data level to include information regarding the registered entity.

19. The article of manufacture of claim 17 containing instructions further operative to cause the computer to perform rich content scanning on the email, wherein the rich content scanning includes scanning the email for spam and malware.

* * * * *